(12) United States Patent
Hamedani

(10) Patent No.: US 9,916,394 B2
(45) Date of Patent: *Mar. 13, 2018

(54) VECTORIZED GRAPH PROCESSING

(71) Applicant: International Business Machines Corporation, Armonk, NY (US)

(72) Inventor: Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/482,152

(22) Filed: Apr. 7, 2017

(65) Prior Publication Data
US 2017/0212966 A1    Jul. 27, 2017

Related U.S. Application Data

(63) Continuation of application No. 14/883,862, filed on Oct. 15, 2015, now Pat. No. 9,704,277.

(51) Int. Cl.
| G06T 11/20 | (2006.01) |
| G06F 17/30 | (2006.01) |
| G06T 9/00  | (2006.01) |

(52) U.S. Cl.
CPC .. *G06F 17/30958* (2013.01); *G06F 17/30486* (2013.01); *G06T 9/00* (2013.01); *G06T 11/206* (2013.01)

(58) Field of Classification Search
CPC ................................................... G06T 11/206
See application file for complete search history.

(56) References Cited

U.S. PATENT DOCUMENTS

| 8,046,797 | B2 * | 10/2011 | Bentolila ........... G06Q 30/0251 705/14.49 |
| 8,751,556 | B2 | 6/2014 | Song |
| 8,819,078 | B2 | 8/2014 | Roy et al. |
| 9,311,082 | B2 | 4/2016 | Bonev et al. |
| 9,495,477 | B1 | 11/2016 | Dehnert et al. |
| 9,734,607 | B2 | 8/2017 | Macko et al. |

(Continued)

OTHER PUBLICATIONS

Sairam Gurajada, Stephan Seufert, Iris Miliaraki, and Martin Theobald. 2014. TriAD: a distributed shared-nothing RDF engine based on asynchronous message passing. In Proceedings of the 2014 ACM SIGMOD International Conference on Management of Data (SIGMOD '14). ACM, New York, NY, USA, 289-300. DOI: http://dx.doi.org/10.1145/2588555.2610511.*

(Continued)

*Primary Examiner* — Phi Hoang
(74) *Attorney, Agent, or Firm* — Yeen Tham; Ryan, Mason & Lewis, LLP

(57) ABSTRACT

An input graph is decomposed into a graph topology component and a graph properties component. A matrix representation is generated for each of the graph topology component and the graph properties component. Each of the graph topology matrix representation and graph properties matrix representation are partitioned into one or more sub-matrices. A forward pass comprising one or more vectorized operations is performed over the one or more sub-matrices. An output matrix is generated in response to the performing step.

17 Claims, 9 Drawing Sheets

(56) References Cited

U.S. PATENT DOCUMENTS

| | | | |
|---|---|---|---|
| 2010/0159437 A1* | 6/2010 | German | G09B 7/02 434/433 |
| 2011/0307685 A1* | 12/2011 | Song | G06F 17/10 712/16 |
| 2013/0124488 A1* | 5/2013 | Kang | G06F 17/30958 707/693 |
| 2013/0212060 A1* | 8/2013 | Crouse | G06F 17/30563 707/602 |
| 2013/0231862 A1 | 9/2013 | Delling et al. | |
| 2014/0172914 A1* | 6/2014 | Elnikety | G06F 17/30979 707/774 |
| 2015/0095348 A1 | 4/2015 | Presta et al. | |
| 2015/0168540 A1* | 6/2015 | Morita | G01S 7/2813 342/21 |
| 2016/0072805 A1* | 3/2016 | Freudiger | H04L 63/0876 713/159 |

OTHER PUBLICATIONS

A. Schätzle et al., "Sempala: Interactive SPARQL Query Processing on Hadoop," Proceedings of the 13th International Semantic Web Conference—Part I (ISWC), Lecture Notes in Computer Science (LNCS), Oct. 2014, pp. 164-179, vol. 8796, Riva del Garda, Italy.

M.A. Bornea et al., "Building an Efficient RDF Store Over a Relational Database," Proceedings of the ACM SIGMOD International Conference on Management of Data, Jun. 2013, pp. 121-132.

S. Melnik et al., "Dremel: Interactive Analysis of Web-Scale Datasets," Proceedings of the 36th International Conference on Very Large Data Bases (VLDB) Endowment, Sep. 2010, pp. 330-339, vol. 3, Nos. 1-2.

S. Sakr et al., "G-SPARQL: A Hybrid Engine for Querying Large Attributed Graphs," Proceedings of the 21st ACM International Conference on Information and Knowledge Management (CIKM), Oct.-Nov. 2012, pp. 335-344.

T. Neumann et al., "The RDF-3X Engine for Scalable Management of RDF Data," The VLDB Journal—The International Journal on Very Large Data Bases, Feb. 2010, pp. 91-113, vol. 19, No. 1.

D.J. Abadi et al., "Scalable Semantic Web Data Management Using Vertical Partitioning," Proceedings of the 33rd International Conference on Very Large Data Bases (VLDB), Sep. 2007, pp. 411-422, Vienna, Austria.

S. Gurajada et al., "TriAD: A Distributed Shared-Nothing RDF Engine Based on Asynchronous Message Passing," Proceedings of the ACM SIGMOD International Conference on Management of Data, Jun. 22-27, 2014, pp. 289-300.

List of IBM Patents or Patent Applications Treated as Related.

\* cited by examiner

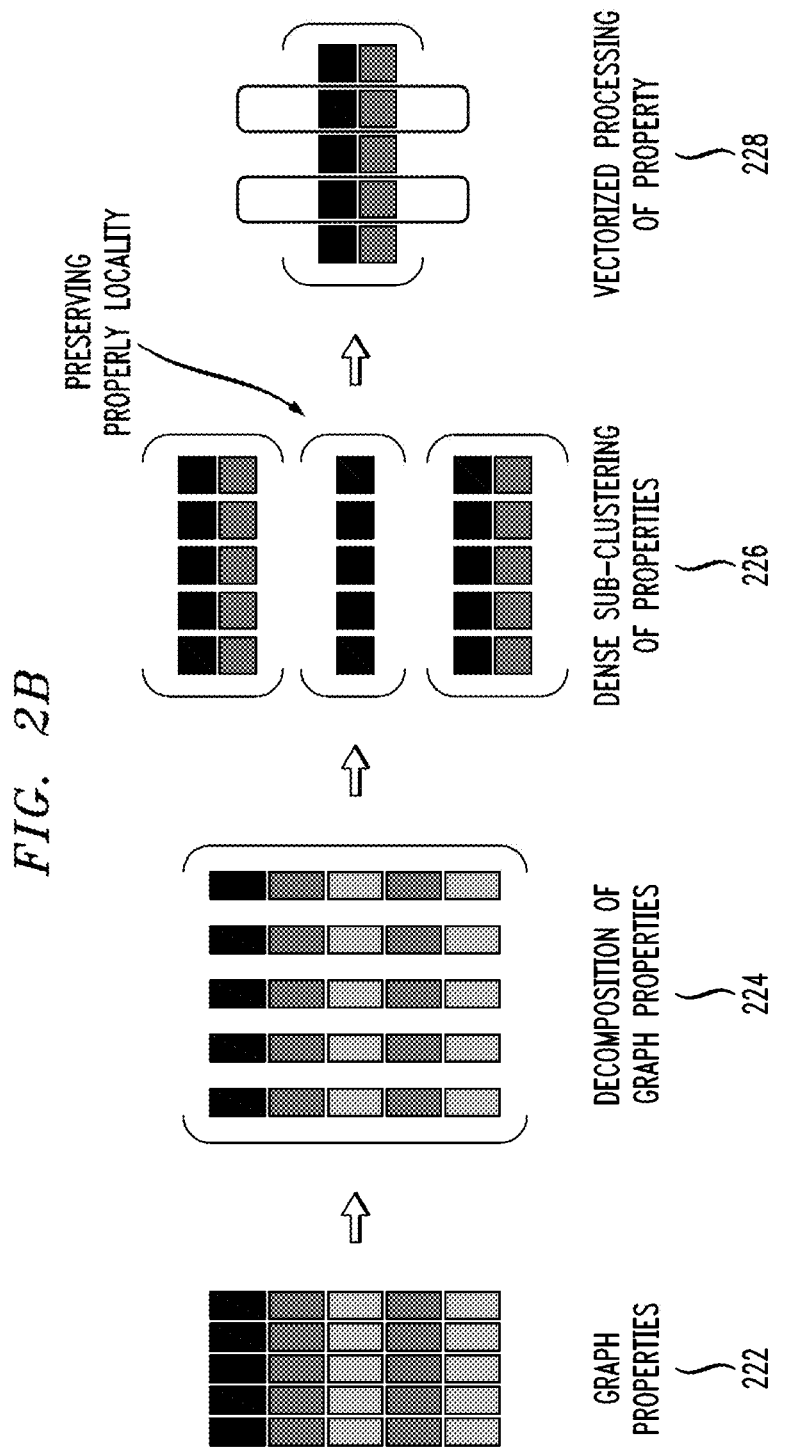

FORWARD PASS
300

BACKWARD PASS
400

US 9,916,394 B2

VECTORIZED GRAPH PROCESSING

BACKGROUND

Data and/or datasets may be represented as a graph, which refers to a collection of nodes (e.g., a person, item or an event) and edges, and optionally, additional information that describes the edges. Some of these nodes may be related to other nodes, and these relationships between nodes may be represented as edges between the related nodes. Graphs may be useful in data mining and/or graph mining applications. However, as the size of the datasets increase, the number of nodes and edges in the associated graph may be massive and the computations that are performed on the graph may also increase in complexity.

SUMMARY

Embodiments of the invention provide techniques for vectorized graph processing.

For example, in one embodiment, a method comprises the following steps. An input graph is decomposed into a graph topology component and a graph properties component. A matrix representation is generated for each of the graph topology component and the graph properties component. Each of the graph topology matrix representation and graph properties matrix representation are partitioned into one or more sub-matrices. A forward pass comprising one or more vectorized operations is performed over the one or more sub-matrices. An output matrix is generated in response to the performing step.

BRIEF DESCRIPTION OF THE DRAWINGS

FIG. 2B illustrates an exemplary process of converting graph properties into a matrix-based representation, according to an embodiment of the invention.

DETAILED DESCRIPTION

Figure 1A:
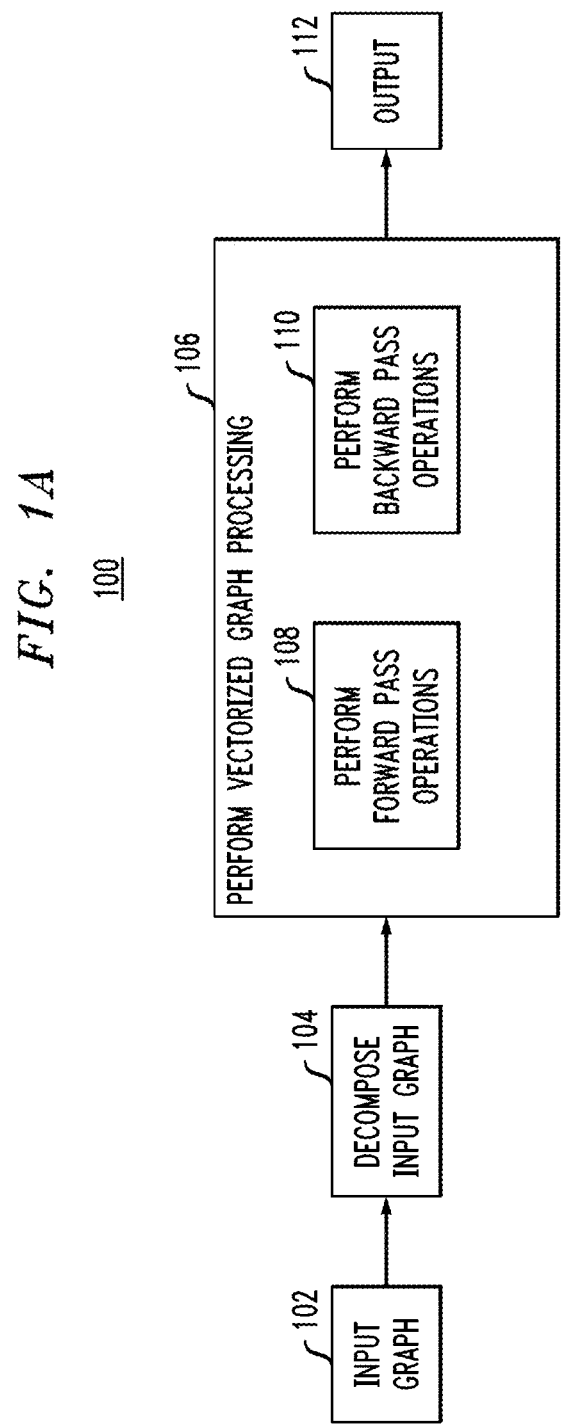
FIG. 1A illustrates an overview process of a methodology for vectorized graph processing, according to an embodiment of the invention.

Illustrative embodiments of the invention may be described herein in the context of illustrative methods, systems and devices for vectorized property graph processing. However, it is to be understood that embodiments of the invention are not limited to the illustrative methods, systems and devices but instead are more broadly applicable to other suitable methods, systems and devices.

Graph data is an emerging and growing field in data management driven mostly by integrating and collecting data over the web (i.e., World Wide Web). In addition to data produced on the web, data may be collected by sensors and mobile devices, which may also be linked to form a large complex graph. As another example, data may be obtained from various data sources, e.g., biological data sources such as UniProt, which may include billions of edges. Moreover, scientific papers in various domains may be represented using graph data to aid scientists in their discovery. For example, large knowledge graphs with millions or billions of edges and nodes may be obtained by extracting facts from millions of papers. These large extracted graphs can further be linked to existing curated data sources to form yet larger graphs.

Various commercial and government applications use graph algorithms on graph data to perform various tasks, such as, for example, finding a shortest or fastest path on a map, analyzing drug interactions, scheduling activities, processing transactions, allocating resources, analyzing social networks, etc. These graph algorithm applications may involve analyzing large databases with information on consumer purchasing patterns, social networking patterns, medical or pharmaceutical data, financial market data, internet data, etc.

However, in the execution of these large database applications, computation hardware often has difficulty achieving the throughput requirements of the graph algorithm computations. For example, most conventional processors employ cache-based memory systems in order to take advantage of the highly localized access patterns involved in processing tasks. Memory access patterns for graph processing are often random in practice and may result in cache misses, thereby degrading performance and increasing computational costs. In addition, a major challenge with existing graph processing is the lack of locality associated with random memory accesses. Preserving locality of access is important as locality of access may increase computational efficiency and reduce the number of cache misses.

Advantageously, the various embodiments discussed herein provide an efficient representation for storing and querying large graphs in which vertices and edges also have attributes and properties (also known as property graphs). As used herein, a node refers to a person, an entity, an item or an event that is to be tracked; a property refers to information relating to one or more nodes; and an edge refers to a line or connection between two nodes or between a node and a property.

The embodiments provided herein focus on topology and attribute space representation of a single node machine and/or distribute settings, and define a set of graph relational algebra that heavily exploits bit-wise and vectorized processing over representation that preserves locality of access. Advantageously, various embodiments of the invention provide systems and/or methods to reduce the cost of processing graphs using a vectorized locality-aware algorithm.

Referring to the figures, FIG. 1A depicts an overview process of a methodology 100 for vectorized property graph processing according to an embodiment of the invention. At step 102, a graph is received as input. Then at step 104, the graph topology of the input graph is partitioned from its graph properties by creating edge and/or vertex decomposition of the input graph's topology and properties. Then at step 106, vectorized graph processing may be performed on the graph topology and graph properties. Various embodiments herein use a vectorized property graph engine (Vraph) to perform step 106. In Vraph, we represent the graph topology divided into a set of dense sub-matrices (e.g., a bit-wise and vectorized representation) and introduce high-level graph relational algebra in order to preserve data locality during graph traversal. Furthermore, graph properties (e.g., attribute space) may also be represented in vectorized-column form for filtering and aggregation operations during graph traversal. Vraph may also comprise two key operators for graph topology traversal (i.e., topology space): (1) a forward pass operator to perform forward pass operations at step 108; and (2) a backward pass operator to perform backward pass operations at step 110 over the graph topology and graph properties. Then at step 112, the output of Vraph may be sent to one or more applications for use in various applications. The output may be a set of nodes with their respective properties and/or a set of nodes and properties. The properties may also be aggregated.

Figure 1B:
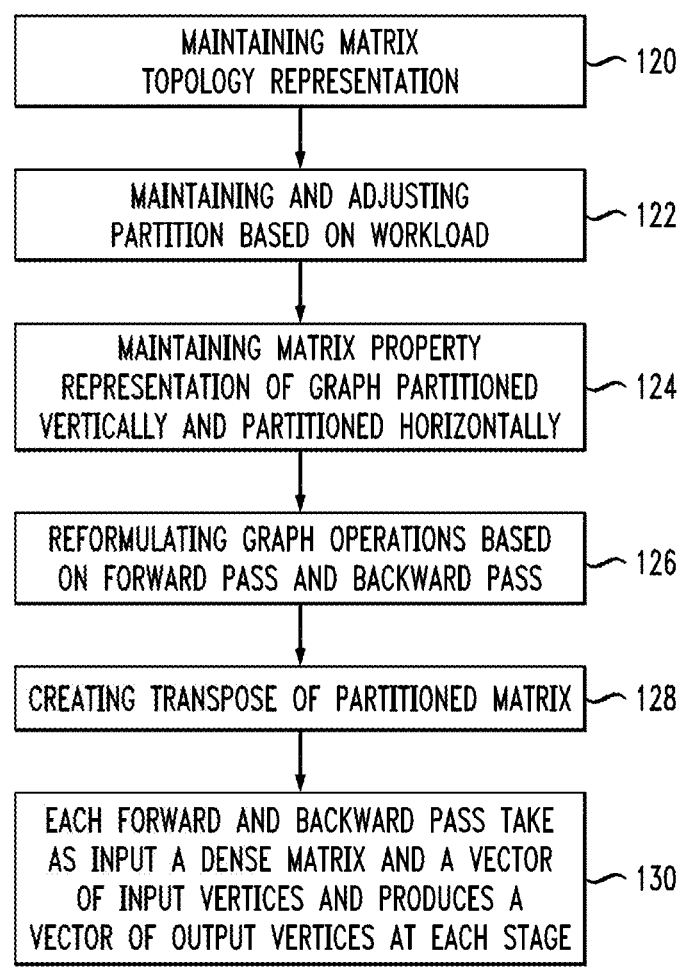
FIG. 1B delineates a vectorized graph processing step of the methodology of FIG. 1A, according to an embodiment of the invention.

FIG. 1B delineates the vectorized graph processing step 106 of FIG. 1A above, according to an embodiment of the invention. More specifically step 106 may comprise the following steps: (step 120) maintaining matrix topology representation of a graph partitioned to maximize sub-matrix densities or to minimize the partition cut; (step 122) dynamically maintaining and adjusting the partitions based on workload during the runtime, taking into account both query workload and changes to the graph (static partitioning or dynamic partitioning by observing pattern of vertices co-accesses; (step 124) maintaining matrix property representation of the graph partitioned vertically (to improve locality of columnar access) and partitioned horizontally based on topology partitioning (to improve locality of access of topology and property together); (step 126) reformulating graph operations over a partitioned, dense topology/property matrix based on forward and backward pass (to improve the locality of execution); (step 128) creating a transpose of the partitioned matrix (topology and/or property) to enable locality for both forward/backward passes; (step 130) inputting each forward and backward pass into a dense matrix and a vector of input vertices and producing a vector of output vertices at each stage recursively. Moreover, the input/output vector vertices are bit-vector where output of various matrices can be combine and split using bit-wise operations using Combine, Split, Union, Intersect vectorized operators. The input and output vertices are extended with additional vectorized fields to include filtering and aggregation functionality. Furthermore, during the traversal, appropriate columns are used to further filter out the set of vertices or to compute aggregation. For performing analytics, aggregation may include sum, average, min, max, or more complex functions. The aggregation may be performed on the properties of each node. As an example, if each node is associated with salary information and the aggregation is to find the average salary, then aggregation will be the average salary associated with all selected nodes in the graph. Furthermore, the filtering can be applied to the properties (e.g., filter all the nodes that have salary lower than $30 per hour).

Figure 2A:
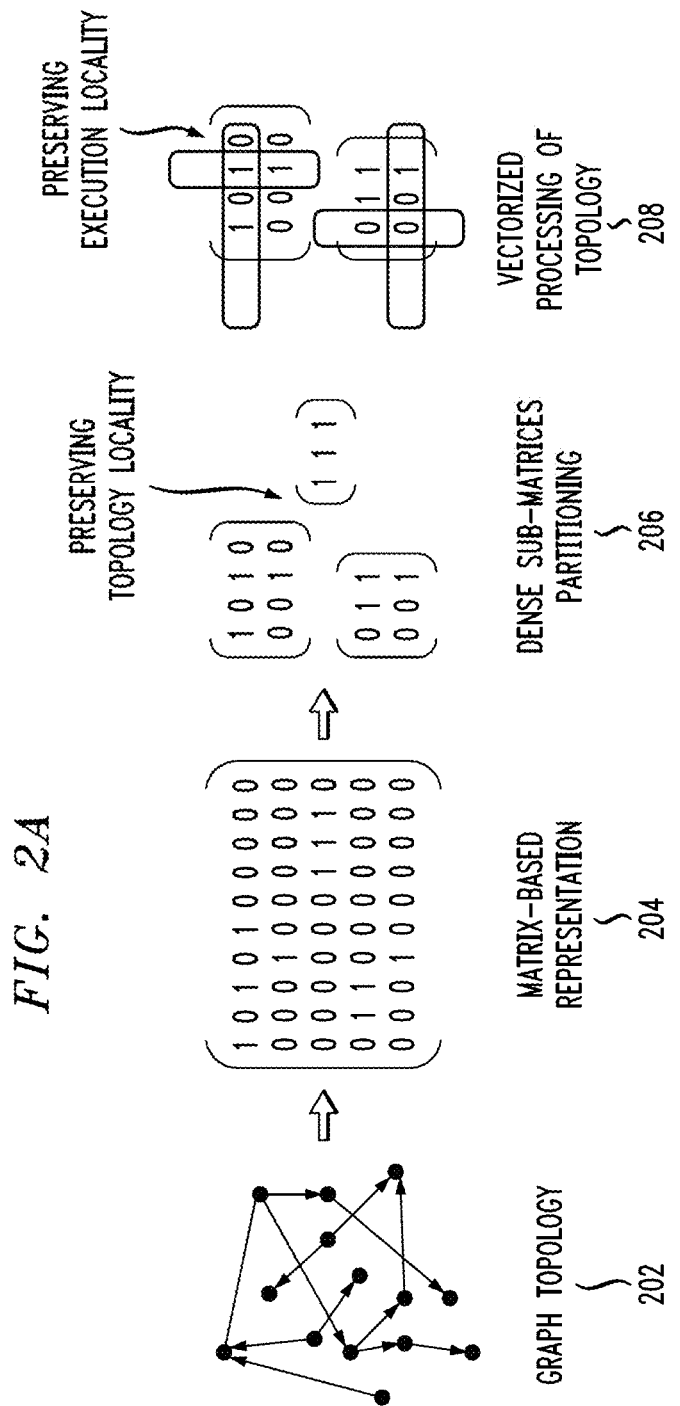
FIG. 2A illustrates an exemplary process of converting a graph topology into a matrix-based representation, according to an embodiment of the invention.

FIGS. 2A and 2B depict exemplary processes by which an input, separated into its graph topology and graph properties, may be represented using matrix representation. Advantageously, embodiments herein separate the representation of the topology and the properties and also store these representations separately. For example, each set of nodes and/or edges within a graph comprises a set of topology and properties. For example, if the node is a person, properties of the person may include age, gender, ethnicity, etc. As another example, an edge may be a friendship between two people (i.e., nodes), and properties of the friendship may include duration of friendship, professional or personal friendship, etc. The topology and properties may be extracted from the set of nodes and/or edges and stored separately for use as described below.

FIG. 2A illustrates an exemplary process of converting the graph topology into a matrix-based representation. Graph topology 202 comprises a set of nodes and edges (e.g., circles and lines shown in 202) of the input graph. The input graph may be represented using matrix representation by partitioning the graph into a set of dense sub-matrices in order to enable vectorized traversal. For example, partitioning may be performed based on static partitioning or dynamic partitioning by observing patterns of vertices and/or co-accesses. That is, we could start with static partitioning given an input graph and a potential set of query workloads. A static partitioning is performed by analyzing the structure of the graph. Subsequently, the initial partitioning can be adjusted dynamically during execution by observing data and query workloads. Matrix-based representation 204 ("matrix 204") comprises rows and columns that represent nodes of the input graph. Within matrix-based representation 204, a "1" represents an edge between the nodes of the input graph. For example, there is a "1" at row 2, column 4 of the matrix 204. This means there is an edge between node 2 and node 4. In contrast, there is a "0" at row 2, column 5 of the matrix 204, meaning there is no edge between node 2 and node 5 of the input graph. Then we identify sub-matrices within the original matrix 204 by partitioning the matrix 204 into dense sub-matrices 206. As shown in matrix 204, there are numerous zeros because not all the nodes are connected to each other. It would be desirable to remove the zeros from the matrix 204 because there is no relationship between those nodes. Advantageously, removal of the zeros could save memory and bring locality of access. As such, matrix 204 is partitioned and made into a set of dense sub-matrices 206. As a result of partitioning the matrix 204 into dense-sub matrices 206, a system may be storing less and preserving the locality because operations may now be performed in a region of the memory that are highly connected. Furthermore, there is locality of representation as all operations are within a matrix, and it would be more efficient looking at a small matrix. While matrix 204 is shown as a matrix having integer values of zeros and ones, the matrix may comprise other integer or character values in alternative embodiments. For example, if each edge could have a label (e.g., friendship, co-worker, spouse, etc), one way to represent the label is to use the edge properties, similar to node properties. As another example, the matrix may have a value of "1" in the cell of matrix when edge is of type "friendship", "2" when the edge is of type "co-worker", "3" when the edge is of type "spouse", etc.

FIG. 2B illustrates an exemplary process of converting the graph properties into a matrix-based representation. Each row of the graph properties 222 represents an edge or a node, while each column represents a property. For example, row one, which may be a node or an edge, has five properties (i.e., five columns). Decomposition of the properties 221 may be performed by separating the columns, such that each column is a vector. For each property, we have a vector for all the nodes, i.e., a single vector that stores the same property for all the nodes. In certain embodiments, the property matrix may already be a dense matrix. In order to partition the properties, we perform dense sub-clustering of the properties 226 by applying similar partitions used in partitioning the topology (e.g., as shown in FIG. 2A) to the properties. As a result of using the same partitions for both the topology matrix and properties matrix, there is now a one-to-one mapping. In addition, we can also perform filtering operations on both the properties and topology matrices as delineated below in the context of FIGS. 3 and 4.

Generally, we start with an original matrix, then we find dense partitions of the matrix. Consequently, we can reformulate operations in a vectorized form to operate on the rows and columns of the sub-matrices. The results of these operations are also stored as vectors (e.g., single vectors).

Figure 3:
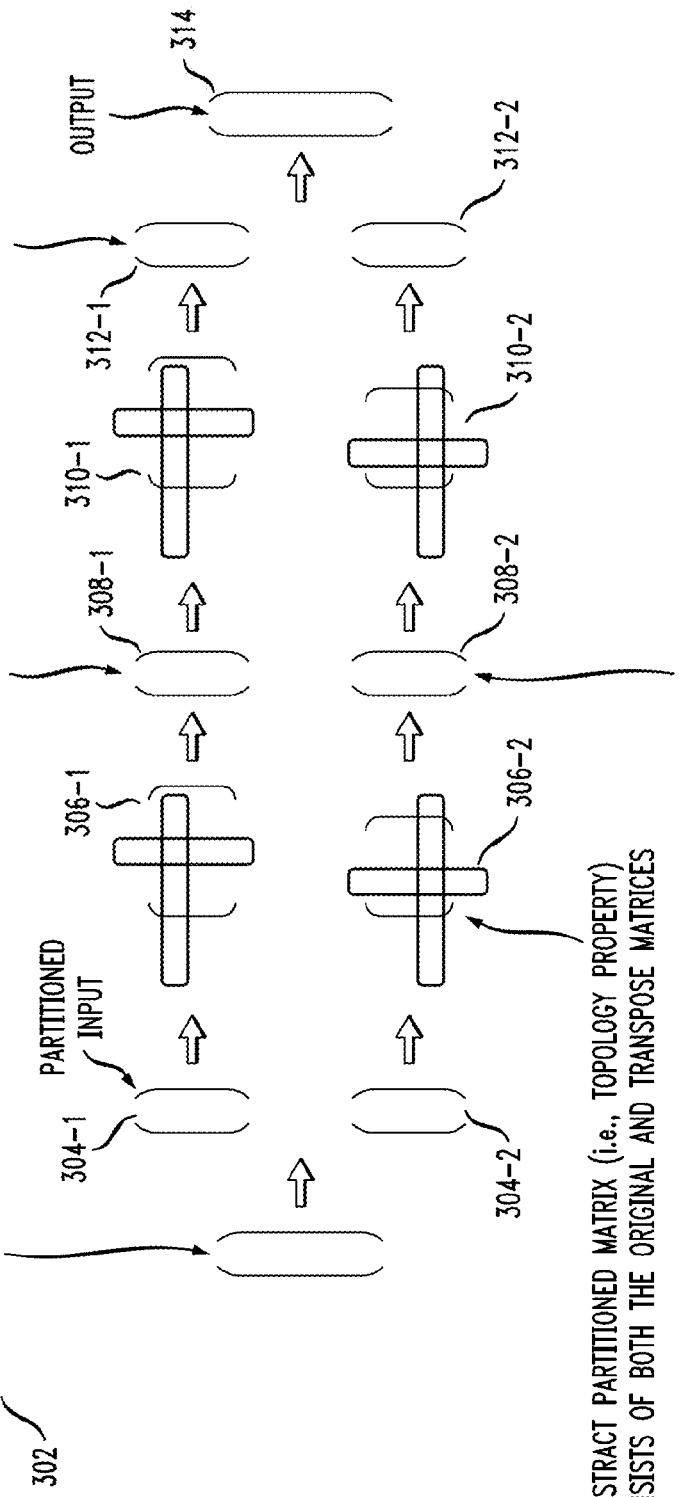
FIG. 3 illustrates a forward pass operation performed over one or more input matrices, according to an embodiment of the invention.
Figure 4:
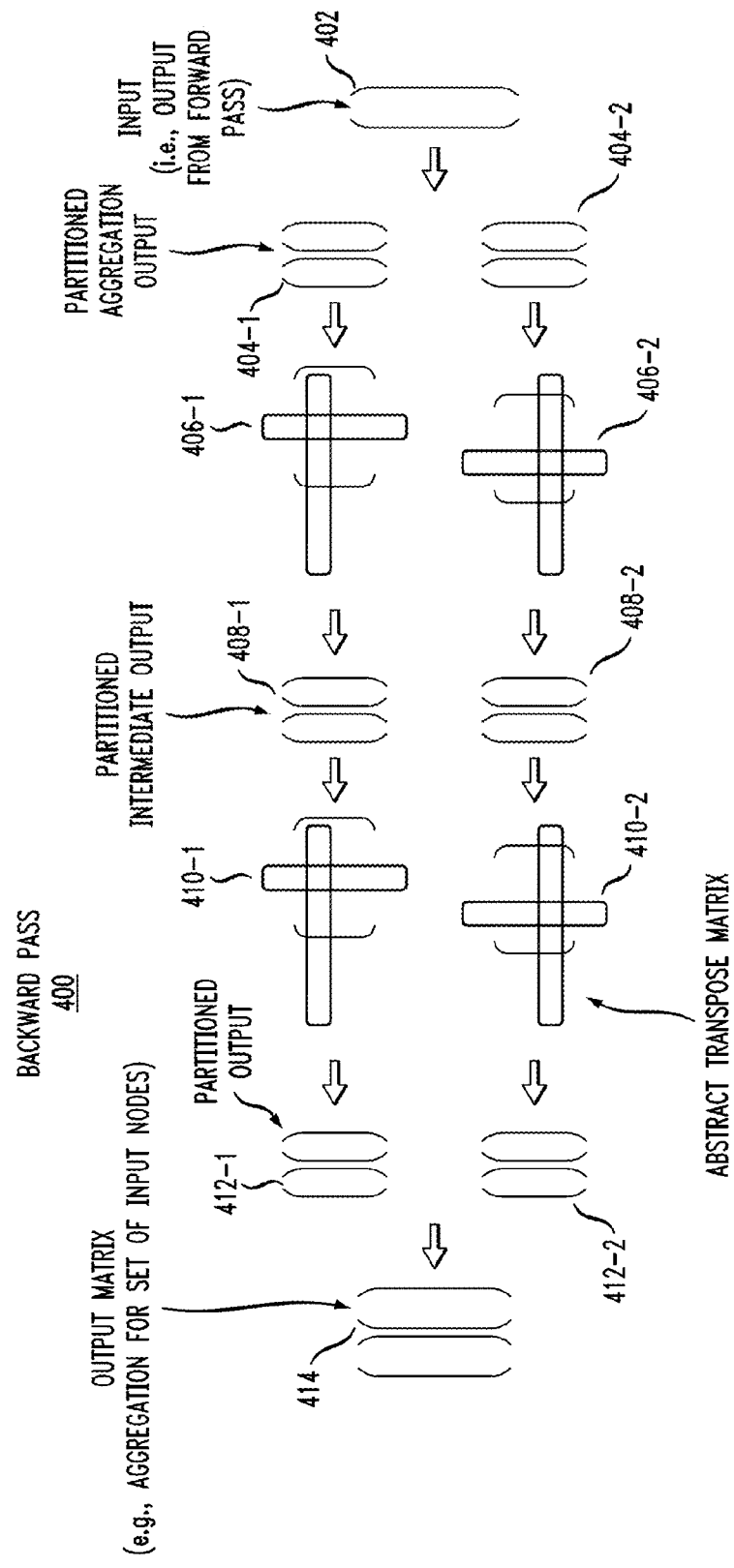
FIG. 4 illustrates a backward pass operation performed over one or more input matrices, according to an embodiment of the invention.

FIGS. 3 and 4 depict a forward pass operation and a backward pass operation, respectively, performed over one or more input matrices, according to an embodiment of the invention. In general, we want to look at all the matrices and sub-matrices in one forward pass through all the relevant matrices, do some or all the operations in a forward pass, and store the partial results as vectors to preserve the locality of the operations. Subsequently, we perform a backward pass to complete any unfinished operations. Notably, the backward pass operation is performed in a reverse order relative to the forward pass operation. As such, there is a locality of access, one pass forward followed by one pass backward, which may be repeated multiple times. Each forward pass/backward pass operator take as input, a dense matrix and a vector of input vertices, and produces a vector of output vertices. The input/output vector vertices are bit-vectors where output of various matrices can be combined and split using bit-wise operations using Combine, Split, Union, and Intersect vectorized operators. In addition to basic capability, input and output vertices are extended with additional vectorized fields to include filtering and aggregation capabilities. Furthermore, the edges and vertices properties (e.g., the attribute space) are stored in columnar form (e.g., vectorized form), where during the traversal, appropriate columns may be used to further filter the set vertices or to compute aggregation. Again, the operation on the columns are also formulated as input and output sets of vertices and edges plus any additional vectorized filtering and aggregation fields. Furthermore, we materialize the transpose of each dense sub-matrix to vectorize the backward traversal as well.

FIG. 3 depicts a forward pass operation 300 performed over an input vector, according to an embodiment of the invention. Input vector 302 may be a matrix of one column with multiple rows representing a set of initial source nodes. In this illustrative embodiment, we start with one vector but other embodiments may start with multiple vectors. Vector 302 may comprise starting nodes (e.g., nodes 1, 4, 6, 10). We then partition vector 302 based on the partitioning used in the topology partition (e.g., FIG. 2A above). This is used as partition inputs 304-1 and 304-2. Next, we perform the vectorized operations based on partition inputs 304-1 and 304-2 as it relates to the sub-matrices. Each abstract partitioned matrix 306-1 and 306-2 (e.g., topology or property matrix) comprises both the original matrix and the transpose of the original matrix. The partitioned intermediate output vectors 308-1 and 308-2 preserve locality of the intermediate results. Further operations are performed on matrices 310-1 and 310-2 to obtain partitioned output vectors 312-1 and 312-2. The output vectors 312-1 and 312-2 may be combined/aggregated as output 314. The output 314 may be a set of reachable nodes.

FIG. 4 depicts a backward pass operation 400 performed over an input vector, according to an embodiment of the invention. Backward pass operation 400 may be performed in a reverse order relative to that of the forward pass operation 300. Notably, the input vector 402 is the transpose of the input vector 302 used in FIG. 2. Input 402 may use partitioned aggregation outputs 404-1 and 404-2 to generate vectors 406-1 and 406-2. Partitioned intermediate outputs 408-1 and 408-2 may be used to generate vectors 410-1 and 410-2. Partitioned output vectors 412-1 and 412-2 may then be aggregated to generate output matrix 414.

In an illustrative example of performing a forward pass and a backward pass on an input matrix/vector, an input indicates: given a set of starting nodes and ending nodes (source nodes and destination nodes), find all possible paths to get from starting node to ending node. The output would be the set of outgoing edges and/or nodes that are reachable given the set of incoming nodes. For example, given an input graph of salary data for a globally distributed company (e.g., a distributed network) with employees (e.g., nodes) all around the world, a user may be interested in average salary associated with all management-level employees within the company. As such, the starting input may be a set of nodes comprising employees of the company, and the destination nodes may be all management-level employees. We may perform a forward pass as detailed in FIG. 3 to find all nodes that are reachable from the set of source nodes. The forward pass may also include a set of filtering conditions. For example, filter all the nodes that have salary lower than $30 per hour. Then we perform a backward pass as detailed in FIG. 4 to perform additional operations and compute the aggregation. Given a set of source nodes, we may have to perform forward/backward pass operations recursively over multiple matrices because information regarding the ending nodes may be stored in other sub-matrices. In order to find the reachable matrices, we may have to check many matrices but there is a locality and we can preserve the locality of access. Notably, we can perform the operations in the same manner on the properties, that is, we can use the same mechanism on the properties as on the topology. As such, there is a duality in how we move forward and backward in the topology and the properties. Sometimes it may be necessary or desirable to filter out some properties, e.g., filter out some nodes that have certain properties or keep nodes that explicitly have certain properties. Furthermore, there is a one-to-one correspondence as we move forward on the topology at the same time that we move forward on the properties. The output may be a set of nodes, e.g., a list of management-level employees who make over $30 per hour. The output may further be refined to compute an average salary for the list of management-level employees. The output may be sent to one or more applications on a user device for further processing and/or display on the user device. For example, the output may be used for another query and/or analytics or simply be displayed on one or more devices.

As another example, going from starting input to final output, given a set of initial outputs, we may want to find all the nodes that are reachable five edges/operations away (e.g., given a starting drug and an ending condition, compute a path size up to seven from the drug to the condition, where each path may represent a specific gene) and then find an aggregation of all the values of the edges, as well as finding an aggregation of all the properties. We perform a forward pass as detailed above in the context of FIG. 3 in order to find all the relevant edges, and then we perform a backward pass as detailed in FIG. 4 above to do additional operations to find the aggregation. We may have to repeat the process of performing a forward pass and backward pass numerous times before we complete the computations. Advantageously, various embodiments herein may complete computations within sub-seconds. In contrast, given the same computations, existing graph processing systems were either unable to complete the computations due to complexity or required hours to complete the same computations.

Using various embodiments of the invention, we want to be able to have an efficient representation and also have locality of access. In certain embodiments we only need one forward pass to find, from the original set of nodes (e.g., set of source nodes), all the elements that are reachable to it, and then working our way backwards in a backward pass given the set of reachable things, we can count the number of possible paths/ways between the source nodes and the destination nodes.

Benefits provided by various embodiments of the invention include: matrix representation (e.g., vectorized topology space representation) resulting in locality of accesses and compression; fast bit-wise Forward, Backward, Split, Combine, Union, Intersect operations that enables locality of accesses and exploiting special hardware instructions; implicit batching of graph traversal and parallelization of traversal using vector processing that process multiple edges and vertices concurrently; columnar representation of properties (e.g., vectorized attribute space representation) resulting in compression and efficient single instruction, multiple data (SIMD); aggregation functionality (e.g., analytics support); and filtering functionality (e.g., attribute space).

Figure 5:
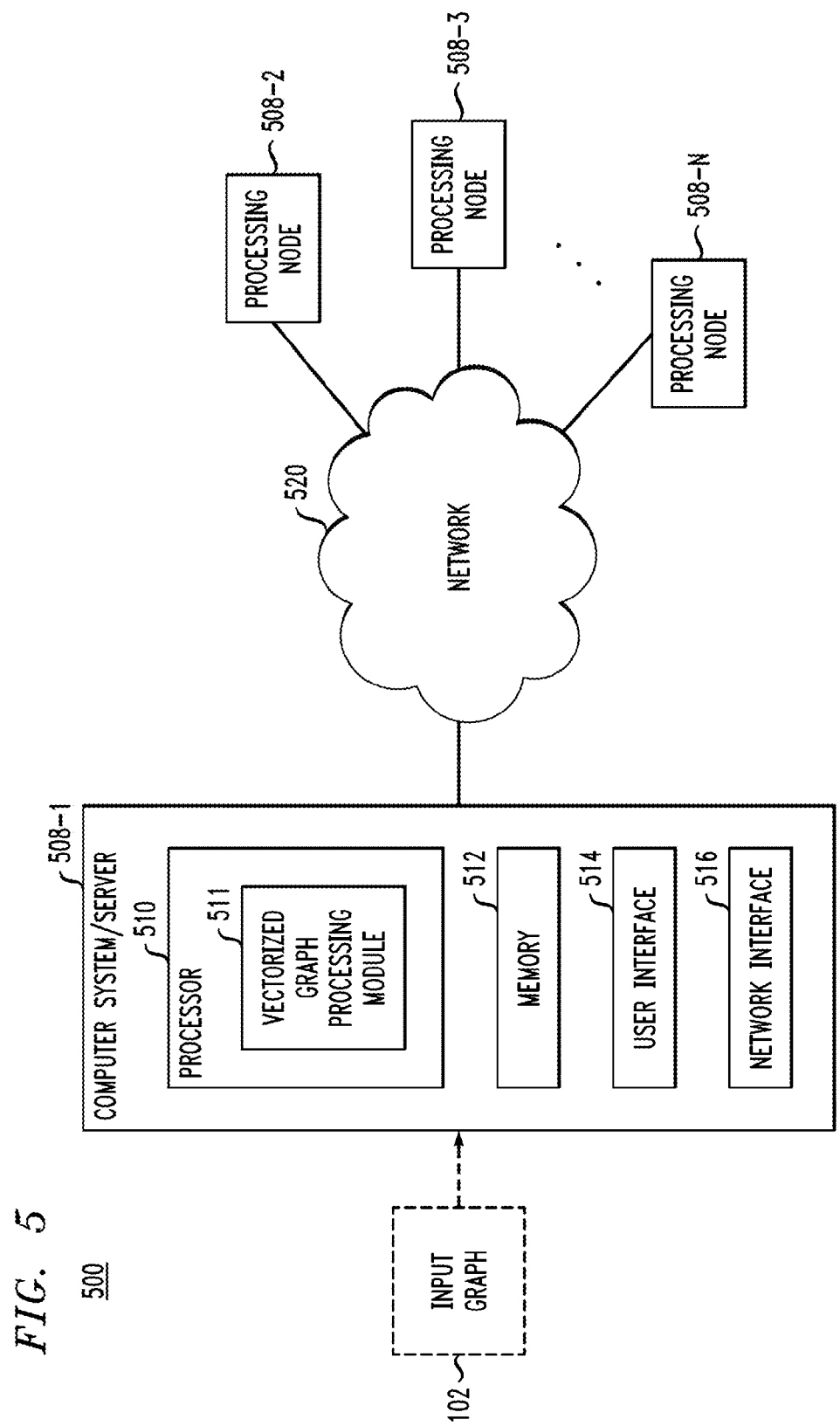
FIG. 5 illustrates an exemplary embodiment of a system for implementing the methodology of FIG. 1.

FIG. 5 depicts a system 500 for implementing methodology 100 of FIG. 1. System 500 comprises one or more processing nodes 508-1 . . . 508-N configured for receiving input graphs (e.g., input graph 102 of FIG. 1) and also configured for communication through network 520. Each of the processing nodes 508-1 . . . 508-N may be a computer system/server 508-1, which may comprise, but is not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 508-1 may include one or more processors 510 coupled to a memory 512, a user interface 514 and a network interface 516. Processor 510 may include a vectorized graph processing module 511 configured to perform one or more steps of methodology 100. User interface 214 may be configured to enable user input into the computer system/server 508. Network interface 516 may be configured to enable the computer system/server 508 to interface with a network 520 and other system components in a distributed network. It is to be appreciated that system 500 may include more or less components than shown in FIG. 5. Furthermore, each of the processing nodes 508-1 . . . 508-N may comprise more or less components than shown in computer system/server 508-1.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention. For example, computer system/server 208 may comprise a computer program product for implementing embodiments of the invention disclosed herein.

The computer readable storage medium (e.g., memory 512) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network (e.g., network 520), including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Processing nodes 508-1 . . . 508-N of FIG. 5 are examples of cloud computing nodes. It is to be appreciated, however, that these computer systems/servers are only examples of suitable cloud computing nodes and is not intended to suggest any limitation as to the scope of use or functionality of embodiments of the invention described herein. Regardless, these computer systems/servers are examples of cloud computing nodes capable of being implemented and/or performing any of the functionality set forth hereinabove.

Figure 6:
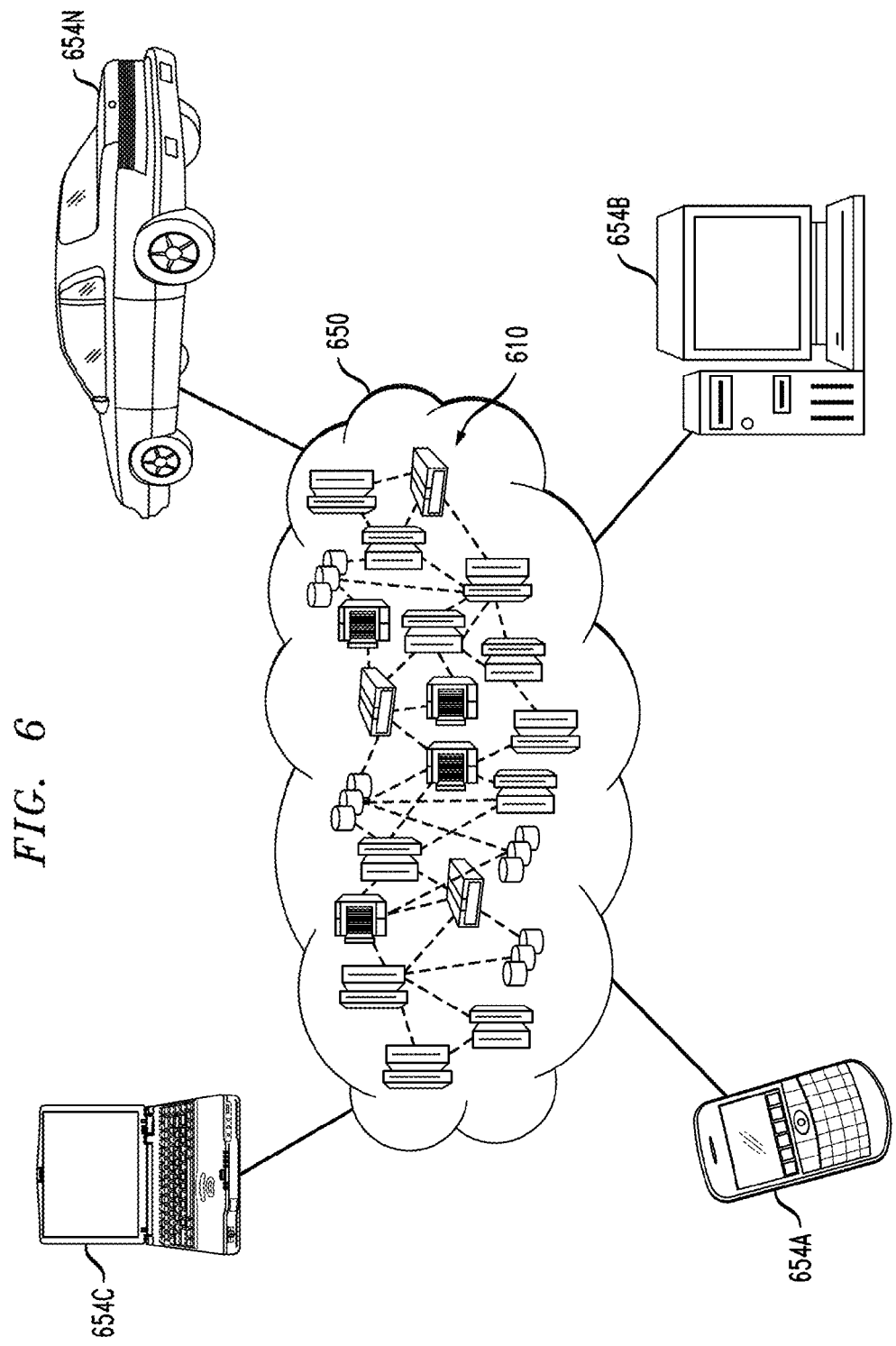
FIG. 6 illustrates a cloud computing environment, according to an embodiment of the invention.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
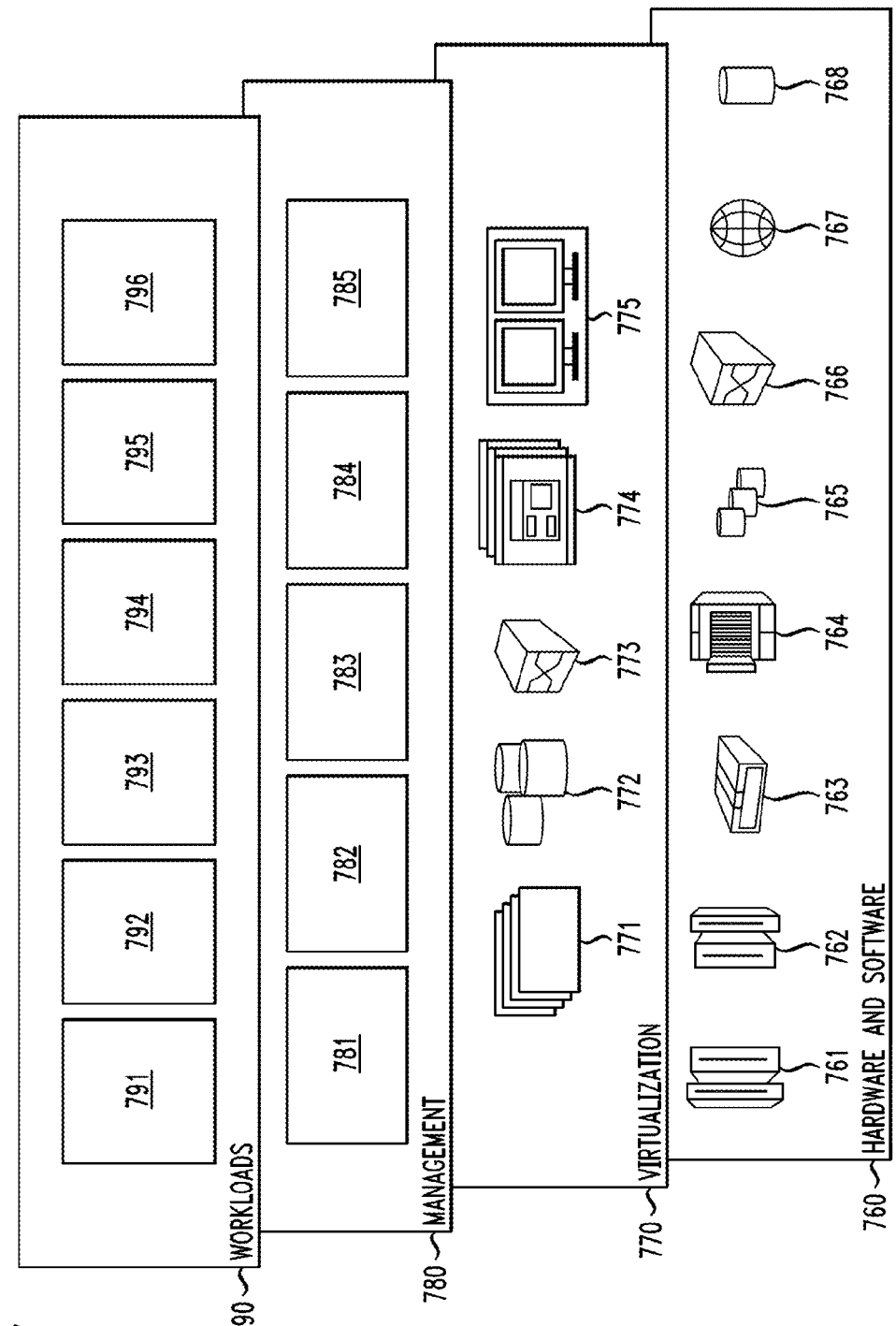
FIG. 7 depicts abstraction model layers, according to an embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and object detection and tracking 796, which may implement the functionality described above with respect to FIGS. 1-6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising the steps of:
    decomposing an input graph into a graph topology component and a graph properties component;
    generating a graph topology matrix representation for the graph topology component and a graph properties matrix representation for the graph properties component;
    partitioning each of the graph topology matrix representation and graph properties matrix representation into one or more sub-matrices;
    performing one or more forward passes comprising one or more vectorized operations over the one or more sub-matrices, and one or more backward passes comprising one or more vectorized operations over transposed versions of the one or more sub-matrices, wherein performing one or more forward passes comprises, receiving as input, at least one of a dense matrix and a vector of input vertices, and wherein performing one or more backward passes comprises, receiving as input, a transposed version of the dense matrix and the vector of input vertices; and
    generating an output matrix in response to the performing step resulting in preservation of locality of access;

wherein the steps are performed by at least one processor device coupled to a memory.

2. The method of claim 1, wherein generating a matrix representation for each of the graph topology component and the graph properties component is performed based on an initial partitioning by observing at least one of patterns of vertices and patterns of co-accesses.

3. The method of claim 2, further comprising adjusting the initial partitioning based on workload during runtime.

4. The method of claim 3, wherein the workload comprises at least one of a query workload and one or more changes to the input graph.

5. The method of claim 1, wherein the one or more sub-matrices are generated by performing dense sub-clustering of one of: (i) one or more edges; and (ii) one or more properties.

6. The method of claim 1, further comprising performing an aggregation function over at least one of one or more vertices and one or more properties.

7. The method of claim 1, further comprising performing a filtering function using one or more columns to filter out one or more sets of vertices.

8. The method of claim 1, wherein the one or more vectorized operations comprises at least one of a combine operation, a split operation, a union operation and an intersect operation.

9. The method of claim 1, wherein the decomposing step comprises creating at least one of edge decomposition and vertex decomposition of the input graph's topology and properties.

10. The method of claim 1, further comprising maintaining matrix representation of the one or more properties of the input graph partitioned vertically to improve locality of columnar access.

11. The method of claim 1, further comprising maintaining matrix representation of the topology of the input graph partitioned horizontally to improve locality of access of the topology and the one or more properties together.

12. The method of claim 1, further comprising preserving locality of intermediate results by storing one or more partitioned intermediate outputs.

13. The method of claim 1, wherein the output matrix comprises at least one of a set of reachable nodes and a set of properties.

14. A method, comprising the steps of:
decomposing an input graph into a graph topology component and a graph properties component;
generating a graph topology matrix representation for the graph topology component and a graph properties matrix representation for the graph properties component;
partitioning each of the graph topology matrix representation and graph properties matrix representation into one or more sub-matrices;
performing one or more forward passes comprising one or more vectorized operations over the one or more sub-matrices, and one or more backward passes comprising one or more vectorized operations over transposed versions of the one or more sub-matrices wherein performing one or more forward passes comprises, receiving as input, at least one of a dense matrix and a vector of input vertices; and
generating an output matrix in response to the performing step resulting in preservation of locality of access, wherein the method further comprises reformulating one or more graph operation over the one or more sub-matrices based on the one or more forward pass and the one or more backward pass such that locality of execution is improved;
wherein the steps are performed by at least one processor device coupled to a memory.

15. A method, comprising the steps of:
decomposing an input graph into a graph topology component and a graph properties component;
generating a graph topology matrix representation for the graph topology component and a graph properties matrix representation for the graph properties component;
partitioning each of the graph topology matrix representation and graph properties matrix representation into one or more sub-matrices;
performing one or more forward passes comprising one or more vectorized operations over the one or more sub-matrices, and one or more backward passes comprising one or more vectorized operations over transposed versions of the one or more sub-matrices, wherein performing one or more forward passes comprises, receiving as input, at least one of a dense matrix and a vector of input vertices, and further wherein the one or more backward passes are performed in reverse order relative to the one or more forward passes; and
generating an output matrix in response to the performing step resulting in preservation of locality of access;
wherein the steps are performed by at least one processor device coupled to a memory.

16. A device comprising:
a memory and a processor operatively coupled to the memory and configured to implement the steps of:
decomposing an input graph into a graph topology component and a graph properties component;
generating a matrix representation for each of the graph topology component and the graph properties component;
partitioning each of the graph topology matrix representation and graph properties matrix representation into one or more sub-matrices;
performing one or more forward passes comprising one or more vectorized operations over the one or more sub-matrices and one or more backward passes comprising one or more vectorized operations over transposed versions of the one or more sub-matrices, wherein performing one or more forward passes comprises, receiving as input, at least one of a dense matrix and a vector of input vertices, and wherein performing one or more backward passes comprises, receiving as input, a transposed version of the dense matrix and the vector of input vertices; and
generating an output matrix in response to the performing step resulting in preservation of locality of access.

17. A computer program product comprising a computer readable storage medium for storing computer readable program code which, when executed, causes a computer to:
decompose an input graph into a graph topology component and a graph properties component;
generate a matrix representation for each of the graph topology component and the graph properties component;
partition each of the graph topology matrix representation and graph properties matrix representation into one or more sub-matrices;
perform one or more forward passes comprising one or more vectorized operations over the one or more sub-matrices and one or more backward passes comprising one or more vectorized operations over transposed versions of the one or more sub-matrices, wherein performing one or more forward passes comprises, receiving as input, at least one of a dense matrix and a vector of input vertices, and wherein performing one or more backward passes comprises, receiving as input, a transposed version of the dense matrix and the vector of input vertices; and generate an output matrix in response to the performing step resulting in preservation of locality of access.

* * * * *